May 21, 1929.　　　　　C. O. GLENN　　　　　1,713,651

TRIPLE VALVE ATTACHMENT

Filed Oct. 29, 1925　　　　3 Sheets-Sheet 1

Inventor
CARL O. GLENN.
By His Attorney

May 21, 1929. C. O. GLENN 1,713,651
TRIPLE VALVE ATTACHMENT
Filed Oct. 29, 1925 3 Sheets-Sheet 2

Inventor
CARL O. GLENN.
By His Attorney

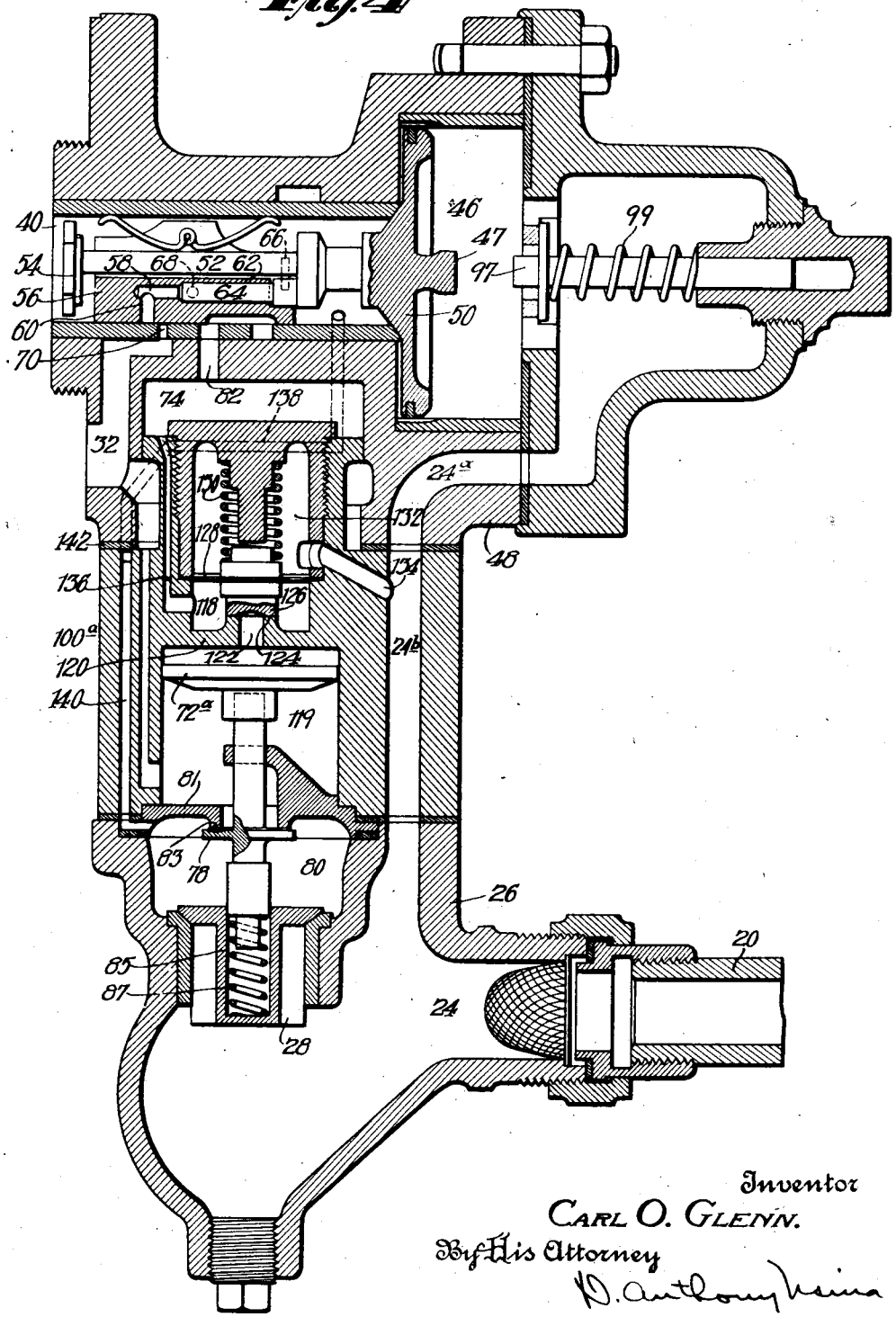

Patented May 21, 1929.

1,713,651

UNITED STATES PATENT OFFICE.

CARL O. GLENN, OF ROCK ISLAND, ILLINOIS, ASSIGNOR TO WALTER H. FOSTER, OF NEW YORK, N. Y.

TRIPLE-VALVE ATTACHMENT.

Application filed October 29, 1925. Serial No. 65,514.

This invention relates generally to railway air brake apparatus and aims to provide improved means for preventing the undesired emergency application of the air brakes. More specifically, the invention aims to provide a self-contained device which can be readily applied to existing air brake equipment without necessitating material alterations to the same such supplementary device being adapted to prevent the undesired emergency application of the air brakes.

The invention will be understood from the following specification when read in connection with the accompanying drawings in which—

Fig. 4 is an enlarged longitudinal section through a triple valve illustrating an alternative form of self-contained prevention device.

Figure 1:
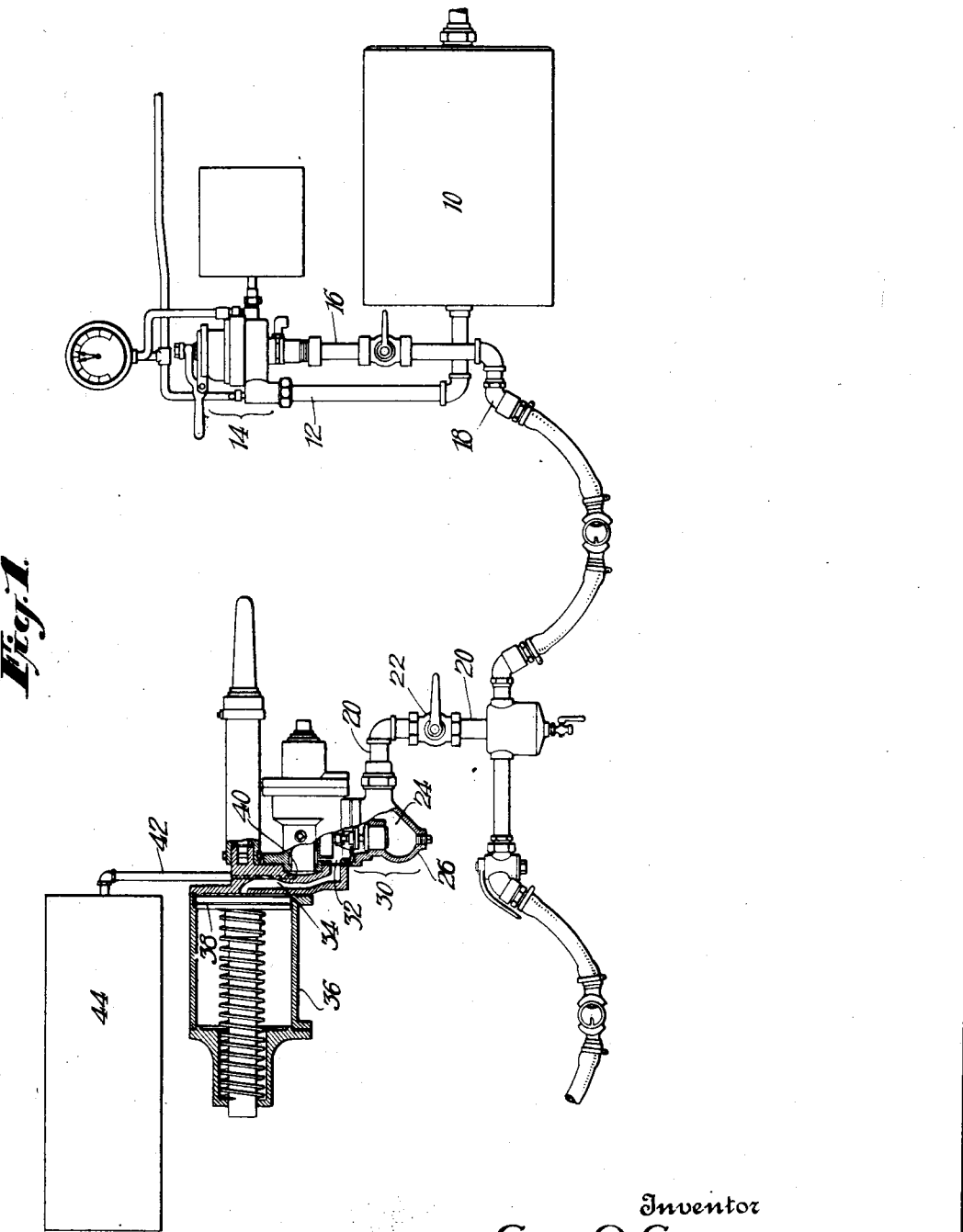
Fig. 1 is a somewhat diagrammatic elevation of a portion of a train air brake equipment including a triple valve embodying my invention.
Figure 2:
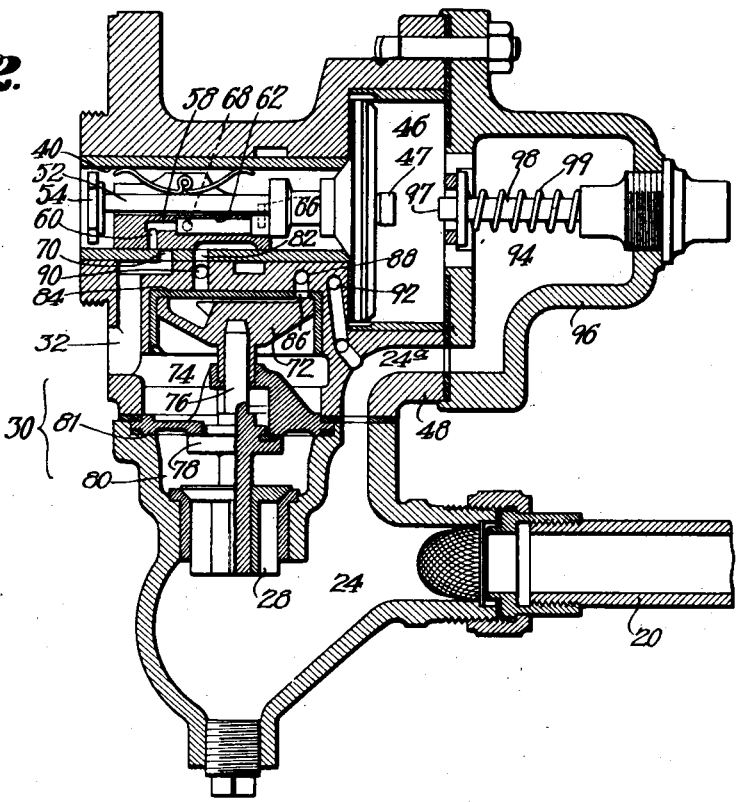
Fig. 2 is a central longitudinal section through the triple valve of Fig. 1.

Referring in detail to the drawings, 10 represents the usual main reservoir usually forming part of the engine equipment of an air brake system and 12 is a supply pipe which connects said reservoir with the engineer's brake valve 14. The latter is connected to the brake pipe 18. This brake pipe runs the full length of the train and is provided with the usual angle cocks and the flexible hose connections and couplings between trains. At each train there is one branch brake pipe 20 and the usual cut-out cock 22 which communicates with a chamber 24 formed in the check valve casing 26 carrying the usual brake pipe check valve 28 of the triple valve indicated as a whole in the drawings by numeral 30. The triple valve is provided with the usual port 32 connected to the port 34 leading to the brake cylinder 36 which houses the usual brake piston 38. The upper part of the triple valve is formed with a chamber 40 which is connected by pipe 42 with the auxiliary reservoir 44 as used in passenger train equipment. In freight train equipment chamber 40 and auxiliary reservoir are directly connected. A chamber 46 formed in the triple valve body 48 has slidably mounted therein the so-called main or triple piston 50. The latter is provided with a rearwardly extending stem 52 with a collar 54 secured to one end thereof for coaction with a slide valve 56 having ports 68, 58 and 60 formed therein. Slidable within a bore 62 of the slide valve is the usual graduating valve 64 which is secured by means of a pin 66 to the piston stem 52. This graduating valve is adapted at the proper time to uncover a lateral port 68 which communicates with the chamber 40 so as to permit auxiliary air to pass through ports 58 and 60 through a port 70 communicating with port 32 leading to the brake cylinder. The triple valve is provided with the usual emergency piston 72 which operates in chamber 74, the piston carrying a stem 76 to which is secured the emergency valve 78 which controls communication between the chamber 74 and the chamber 80. In the usual construction of the triple valve, a port 82 is formed in the triple valve as shown in Figs. 2 and 4. In the triple valve as usually constructed heretofore, this port permitted auxiliary reservoir pressure to be exerted on the top of piston 72 when the usual inclined side valve port not shown was brought into register with said port 82. In modifying the triple valve to apply my invention thereto, I merely insert a cupped bushing 84 in the chamber 74 above the piston 72 so as to close off connection between the port 82 and the top of the chamber 84 as illustrated in the embodiment of the invention shown in Figs. 2 and 3. In the plate 84, I provide a port 86 which communicates with a passage 88 formed by drilling out a portion of the valve body. A similarly formed passage 90 communicates with the port 82. A passage 92 is formed in the triple valve body to communicate with a brake pipe conduit 24ª which is cored in the triple valve body and communicates with the chamber 94 formed in the cap member 96 which guides the usual spring pressed graduating spindle 98.

The ports 88, 90 and 92 communicate respectively with ports 88ª, 90ª and 92ª which ports are formed in a self-containued unit indicated as a whole by numeral 100. This unit can be conveniently attached to existing triple valves by means of a cap screw 102 passing through a suitable opening in the body of the unit and engaging threads of a hole tapped into the triple valve body, suitable dowel pins 104 engaging both unit 100 and the valve body to properly position the parts.

The communication between ports 88ᵃ and 90ᵃ and hence also communication between ports 88 and 90, is controlled by a valve 106 carried by a diaphragm 108 which is pressed by a spring 110 as well as by brake pipe pressure in the chamber 112 against a valve seat 114 formed on the end of a bushing 116 having a central passage therein which communicates with the port 88ᵃ. As thus arranged, it will be readily apparent that the combined pressure of the spring 110 and the pressure in the brake pipe holds the valve 106 on its seat 114 and thereby normally prevents communication between ports 88ᵃ and 90ᵃ. So long as the valve 106 is in the closed position shown in Fig. 3, the auxiliary reservoir pressure from port 90 cannot reach port 88, hence, emergency piston 72 cannot be forced downward to open the emergency valve 78 until the pressure in chamber 112 (or in other words the brake pipe pressure) has been reduced at a predetermined rate.

The self-contained unit 100 just described in detail prevents the undesired emergency application of the air brakes when the engineer merely reduces the brake pipe pressure sufficiently to cause the service application of brake. It is known to those skilled in the art that undesired emergency applications of the brakes are frequently made when the engineer merely reduces the brake pipe pressure sufficiently to cause a regular service or gradual application of the brake. This is a well known defect in the triple valves as ordinarily constructed and it comes about because the main piston 50 of the usual triple valve frequently sticks and the frictional resistance between the slide valve 56 and its seat prevents the piston 46 from moving as it theoretically should in response to the differential pressures existing on the auxiliary air face of the piston 50 and the brake pipe face of this piston. When the engineer makes an initial brake pipe reduction by manipulating his valve 14 and does not secure braking action because the slide valve or main piston 50 is held back by the friction he will make further reductions in the brake pipe pressure, and when the pressure difference between the opposite faces of the piston 50 is sufficient to overcome the friction or other causes preventing the gradual movement of the main piston 50, the latter will snap quickly to what we know as emergency position in this art. That is to say, the piston will make its full travel causing its abutment 47 to strike the end 97 of the graduating spindle 98 and compress the graduating spring 99. Such a movement of the piston 50 in the triple valve as usually constructed would cause an emergency application of the air brakes as this movement of the piston would bring port 60 of the slide valve into register with the port 82 and thus permit auxiliary reservoir pressure to force down the emergency piston 72, thereby opening the emergency valve 78 and permitting both brake pipe pressure and auxiliary air pressure to flow through chamber 32 to the brake cylinder and hence cause an emergency application of the brakes. Such undesired emergency application of the brakes is prevented by my invention inasmuch as the valve 106 cannot be unseated until the brake pipe pressure has been reduced at a predetermined rate (this rate is usually eight pounds per second) and the engineer never makes such a quick reduction unless an emergency application of the brakes is desired.

Of course, it will be understood that when such an emergency application is desired, the auxiliary air flow from chamber 40 through auxiliary port 82, passage 90 and passage 90ᵃ to chamber 114 in the prevention device, will be sufficient to overcome the brake pipe pressure in chamber 112 and the force of the spring 110, thus, auxiliary air will flow through passage 116, port 88ᵃ and port 88 to the top of chamber 74 and thereby depress the emergency piston 72 opening the emergency valve 78 thus permitting the brake pipe pressure to lift the check valve 28 and pass through chambers 80 and 74 to port 32 to the brake cylinder and cause a desired emergency application of the brakes.

Figure 3:
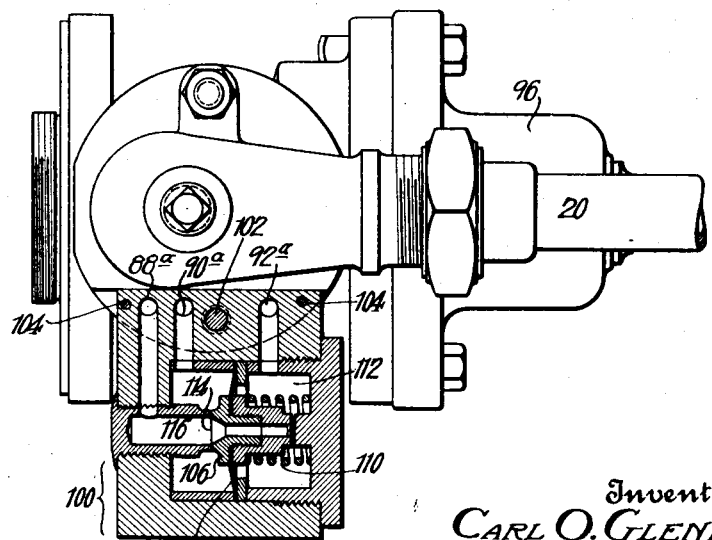
Fig. 3 is an inverted plan of Fig. 2, the parts shown in section illustrating one form of self-contained unit for preventing the emergency application of brakes.

The use of prevention device 100 illustrated in Fig. 3 merely necessitates the drilling of ports 88, 90 and 92 in existing air brake triple valves and insertion of cup bushing 84 to close off the port 82 formed in the typical forms of triple valve.

In an alternative embodiment of the invention an undesired emergency application can be prevented by the use of a device which does not necessitate any machine work on the existing triple valve equipment. Such a device is shown at 100ᵃ in Fig. 4 where it will be noted that the self-contained unit in this form of the invention is inserted between the usual triple valve body 48 and the usual check valve casing 26. The parts are held in this assembled relationship by bolts which pass through the same holes provided for the bolts which normally secure the body 48 to the check valve casing 26, it only being necessary when using this prevention unit to provide longer bolts in place of those removed from the stock triple valve. In this embodiment of the invention, it is unnecessary to provide the plate 84, the port 82 communicating directly with the chamber 74 which usually accommodates the emergency piston. With this arrangement, I remove the emergency piston from the chamber 74 and mount it as indicated at 72ᵃ within the chamber 119 of the prevention device 100ᵃ. The chamber 80 is identical with the similar chamber of the typical form of triple valve such as illustrated in Fig. 2 and the plate 81 which separates chamber 80 from the chamber 118 is practically a duplicate and in fact may be the same plate which is provided with the usual triple valve such as indicated at 81 in Fig. 2. This plate is provided with a suitable valve seat 83 with which the emergency valve 78 coacts, the stem of this emergency valve telescopically engaging a bore 85 formed in the check valve 28, the extremity of the emergency valve stem is seated against the emergency valve spring 87.

An intermediate wall 120 forms the top of chamber 118, this wall having a central port 122 and a valve seat 124 for coaction with a valve 126 carried by a diaphragm 128 pressed downwardly by a spring 130 and by the brake pipe pressure within the chamber 132, this chamber being connected by port 134 with a duct 24$^b$ formed in the unit 100$^a$ which duct is aligned with the similar duct in check valve casing communicating with the chamber 24. It is thus apparent that fluid pressure from the brake pipe 20 and spring 130 tend to hold valve 126 on the seat 124. This prevents the flow of auxiliary air through chamber 74 and port 136 formed in the body of the unit 100$^a$ to the chamber above piston 72$^a$. It will be readily understood that the valve 126 performs identically the same function as the valve 106 in the alternative construction shown in Fig. 3. It will thus be clear without repeating the description and operation of the triple valve in detail that the valve 126 will prevent an undesired emergency application of the air brakes when the engineer merely reduces the brake pipe pressure at a rate to give a service application to the brakes even though the emergency piston 46 assumes the so-called emergency position. However, when the engineer's valve is moved to position to reduce the brake pipe pressure at a sufficient rate (usually at the rate of eight pounds reduction per second) an unbalanced condition will be established and the auxiliary reservoir pressure flowing through port 136 will then be sufficient to overcome the resistance of spring 130 and lift the diaphragm 128 and valve 126 so as to permit the emergency piston 72$^a$ to be depressed and thereby open the emergency valve 78 thus allow brake pipe pressure as well as auxiliary air pressure to enter the brake cylinder and thereby effect an emergency application to the brakes. In certain types of triple valves (those known in the art as Westinghouse K$^1$ and K$^2$) a quick service port such as indicated in dotted lines at 138 is provided. For adapting my device for use with such a type of triple valve, I form in the unit 100$^a$ a port 140 which provides an avenue of communication between the chamber 80 and said quick service port 138. Hence, this device can be used also with those types of triple valves having such a quick service port. When the device is applied to valves not having the quick service port, the upper end of the passage 140 is merely blanked off or closed by the gasket 142 which is used between the unit 100$^a$ and the triple valve body 48.

From the foregoing it will be apparent that my invention provides a self-contained unit which is adapted to be applied to existing air brake equipment without making material changes therein and that such unit contains means for preventing the undesired emergency application of the air brake without in any way attempting to control the movement of the main or so-called triple piston 50. In short, when the triple piston moves to emergency position by freeing itself from obstructions or overcoming the sticking action due to friction, freezing of accumulated water in the valve parts or insufficient lubrication, the emergency valve will be prevented from opening. However, when sufficient reduction in the brake pipe pressure is made by manipulation of the engineer's valve (or by any reduction in the grade pipe caused by automatic train stop apparatus or manipulation of the conductor's valve) the main triple piston 50 will be moved by the predominating pressure from the auxiliary reservoir which is sufficient to open communication through the prevention device from the auxiliary reservoir to the emergency piston and thereby permit the unseating of the emergency valve.

In the embodiment illustrated in Fig. 4, the parts 72$^a$, 81 and 78 are interchangeable with the similar parts 72, 81 and 78 shown in Fig. 2, it being understood that the illustrations are drawn at different scales.

While I have described with great particularity the details of the specific embodiments of the invention herein illustrated, it is not to be construed that I am limited thereto as various modifications and substitution of equivalents may be made by those skilled in the art without departing from the spirit and scope of the invention as defined in the appended claims.

What I claim is:—

1. The combination with a triple valve such as used in air brake apparatus having main triple piston and emergency piston, of a separately attached device arranged to permit the movement of said emergency piston only when the brake pipe pressure is reduced at a rate greater than a predetermined minimum rate, said main triple piston being arranged to travel to different positions respectively for service and emergency application of the brakes.

2. The combination with a triple valve such as used in air brake apparatus having the usual main triple piston and emergency piston, of a separate device detachably secured to said triple valve and arranged to permit the movement of said emergency piston only when the brake pipe pressure is reduced at a rate of approximately eight pounds per second, said main triple piston being arranged to travel to different positions respectively for service and emergency application of the brakes.

3. In an air brake apparatus including a brake cylinder and the usual triple valve connected to the usual brake pipe, an auxiliary reservoir, said triple valve having a main triple piston, slide valve, graduating valve, emergency piston and emergency valve actuated thereby and a self-contained unit adapted to be attached to said triple valve for preventing the undesired emergency application of the brakes including a valve movable in response to differences in pressure between the brake pipe and the auxiliary reservoir, said main triple piston being arranged to travel to different positions respectively for service and emergency application of the brakes.

4. In combination with the auxiliary reservoir, brake pipe and triple valve of an air brake apparatus having a triple valve, slide valve, graduating valve, emergency piston and emergency valve actuated thereby, a device for preventing the undersired emergency application of the brakes including a valve movable in response to differences in pressure between the brake pipe and the auxiliary reservoir, said last named valve controlling the supply of auxiliary air to a chamber on one side of said emergency piston.

5. A triple valve in combination with a brake pipe, auxiliary reservoir and brake cylinder of a railway brake apparatus, said triple valve including an upper valve body provided with the usual main triple piston, slide valve and graduating valve, a check valve casing connected with the brake pipe, and a device adapted to prevent the undesired emergency application of the brakes consisting of a self-contained unit interposed between said triple valve body and said check valve casing, said unit containing a preventing valve responsive to variations in pressure between the brake pipe and the auxiliary reservoir, said unit carrying an emergency piston and an emergency valve whose movements are controlled by said preventing valve.

6. In combination with a triple valve having a main triple piston and associated slide and graduating valves, also having an emergency piston and emergency valve associated therewith substantially as described, of a device for preventing the undesired movement of said emergency piston, said device controlling the supply of fluid pressure to said emergency piston, the movement of said preventing valve being responsive to variations in pressure between the brake pipe and the auxiliary reservoir, said main triple piston being arranged to dwell at different positions respectively for service and emergency application of the brakes.

In witness whereof, I have hereunto signed my name.

CARL O. GLENN.